United States Patent
Bolzoni et al.

(10) Patent No.: US 11,110,752 B2
(45) Date of Patent: Sep. 7, 2021

(54) WINTER TYRE

(71) Applicant: PIRELLI TYRE S.P.A., Milan (IT)

(72) Inventors: Roberto Bolzoni, Milan (IT);
Gianfranco Colombo, Milan (IT);
Alberto Abondio, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 659 days.

(21) Appl. No.: 15/909,902

(22) Filed: Mar. 1, 2018

(65) Prior Publication Data
US 2018/0272812 A1 Sep. 27, 2018

Related U.S. Application Data

(62) Division of application No. 14/653,841, filed as application No. PCT/IB2014/059257 on Feb. 26, 2014, now abandoned.
(Continued)

(30) Foreign Application Priority Data

Feb. 28, 2013 (IT) .......................... MI2013A000291

(51) Int. Cl.
*B60C 11/12* (2006.01)
*B60C 5/00* (2006.01)
*B60C 11/04* (2006.01)

(52) U.S. Cl.
CPC ............ *B60C 11/1204* (2013.01); *B60C 5/00* (2013.01); *B60C 11/04* (2013.01);
(Continued)

(58) Field of Classification Search
CPC ............ B60C 11/1204; B60C 11/1218; B60C 11/1222; B60C 2011/1213
See application file for complete search history.

(56) References Cited

U.S. PATENT DOCUMENTS 6,427,737 B1 * 8/2002 Katayama ............... B60C 11/11
152/209.21
2007/0199634 A1 * 8/2007 Sakamaki ........... B60C 11/1218
152/209.23
(Continued)

FOREIGN PATENT DOCUMENTS

EP 1623818 A1 2/2006
JP 11-048721 A * 2/1999
(Continued)

OTHER PUBLICATIONS

Machine translation for Japan 11-048721 (Year: 2020).*
(Continued)

*Primary Examiner* — Steven D Maki
(74) *Attorney, Agent, or Firm* — Steinfl + Bruno LLP

(57) ABSTRACT

A winter tyre is described having a tread band wherein a plurality of blocks configured to obtain optimal performance both on snow-covered roads and on dry and wet roads in specific conditions of use (in particular during acceleration, braking or cornering with high power vehicles). Each of the aforementioned blocks has at least one sipe that defines two adjacent block portions in the respective block, each block portion having a respective surface facing the sipe. The surface has a radially outer portion having a profile which is substantially undulating, a radially inner portion also having a profile which is substantially undulating and an intermediate portion arranged between the radially outer portion and the radially inner portion and having a profile which is substantially rectilinear.

20 Claims, 9 Drawing Sheets

Related U.S. Application Data

(60) Provisional application No. 61/775,059, filed on Mar. 8, 2013.

(52) U.S. Cl.
CPC ...... *B60C 11/1218* (2013.01); *B60C 11/1222* (2013.01); *B60C 2011/1213* (2013.01)

(56) References Cited

U.S. PATENT DOCUMENTS

| | | | | |
|---|---|---|---|---|
| 2008/0135149 | A1* | 6/2008 | Sakamaki | B60C 11/1263 152/209.18 |
| 2010/0224297 | A1* | 9/2010 | Kiwaki | B60C 11/1218 152/209.23 |
| 2013/0118662 | A1* | 5/2013 | Kameda | B60C 11/0302 152/209.8 |
| 2013/0118663 | A1* | 5/2013 | Kishizoe | B60C 11/1218 152/209.18 |
| 2015/0352904 | A1 | 12/2015 | Bolzoni et al. | |

FOREIGN PATENT DOCUMENTS

| | | | |
|---|---|---|---|
| JP | 2003-118322 | A | 8/2005 |
| JP | 3682918 | B2 | 8/2005 |
| JP | 2005-162197 | A * | 6/2006 |
| JP | 2006-298331 | A * | 11/2006 |
| JP | 4278770 | B2 | 6/2009 |
| WO | WO-99/48707 | A1 * | 9/1999 |
| WO | 2013/174737 | A1 | 11/2018 |

OTHER PUBLICATIONS

Machine translation for Japan 2006-298331 (Year: 2020).*
Machine translation for Japan 2005-162197 (Year: 2020).*
Office Action for Russian Patent Application No. 2015139821 filed Feb. 26, 2014 on behalf of Pirelli Tyre S.P.A.. dated Feb. 27, 2018. (Russian Original + English translation). 9 pages.
PCT International Preliminary Report on Patentability for PCT/IB2014/059257 filed Feb. 26, 2014 in the name of Pirelli Tyre S.P.A. dated Sep. 1, 2015. 6 pages.
First Office Action for EP14714370.5 filed Feb. 26, 2014 in the name of Pirelli Tyre S.P.A. dated Sep. 24, 2018. 6 pages.

* cited by examiner

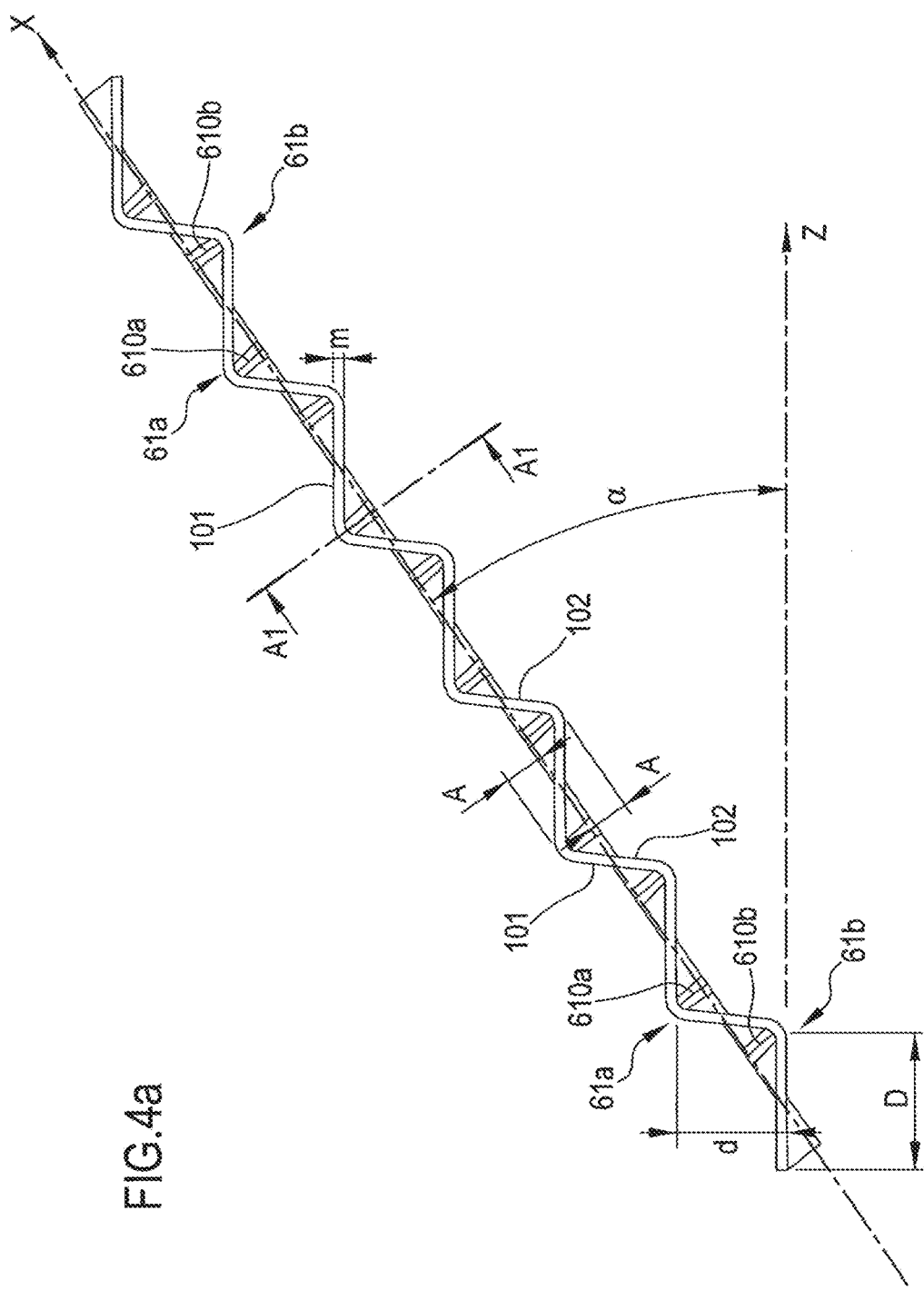

FIG.4b
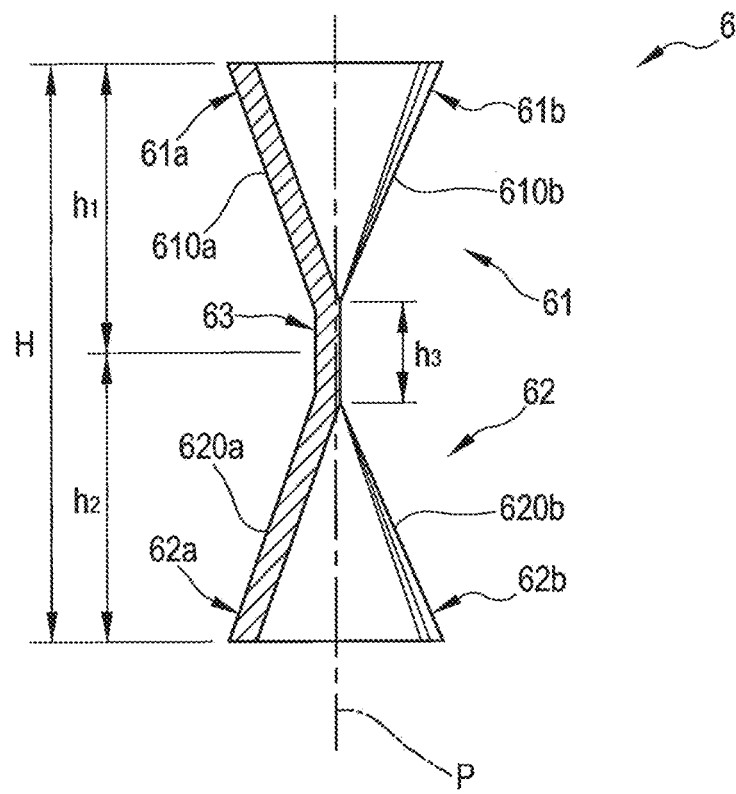
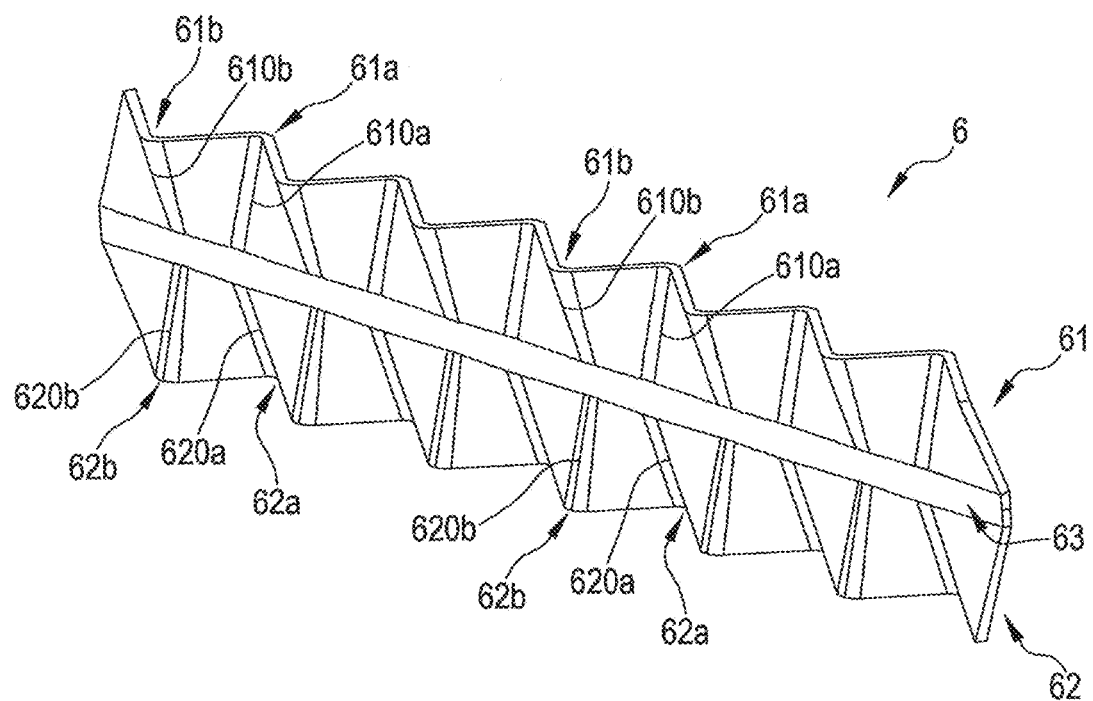
FIG.4c

FIG.6b
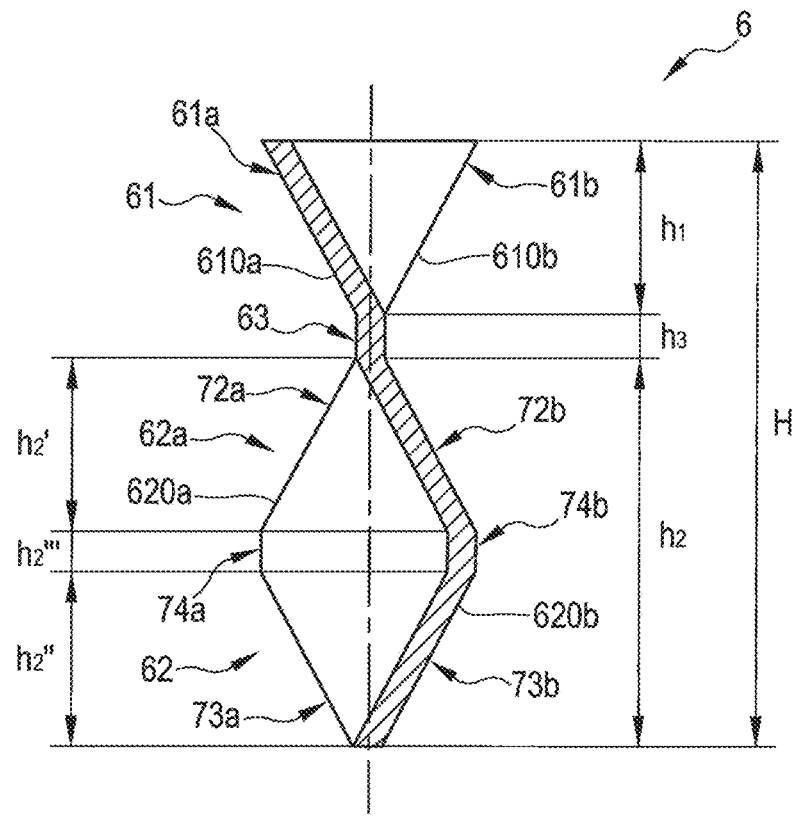
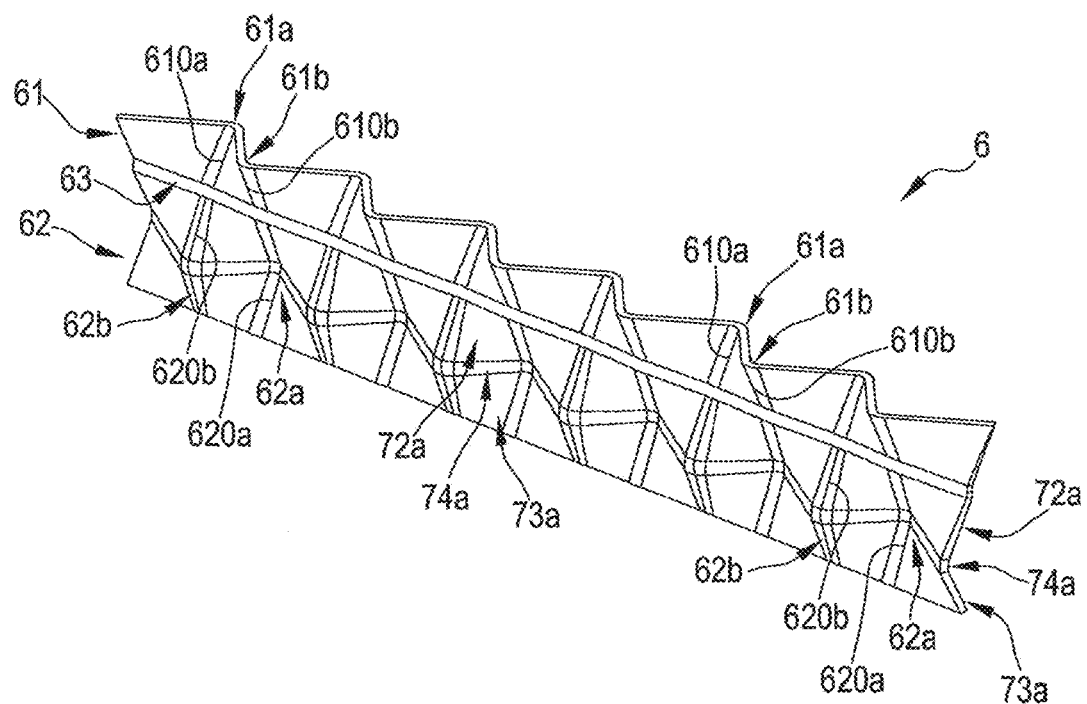
FIG.6c

WINTER TYRE

CROSS REFERENCE TO RELATED APPLICATIONS

The present application is a divisional application of U.S. application Ser. No. 14/653,841 filed on Jun. 18, 2015, which, in turn, is the US national stage of International Patent Application PCT/IB2014/059257 filed internationally on Feb. 26, 2014, which, in turn, claims priority to Italian Patent Application No. MI2013A000291 filed on Feb. 28, 2013 and to U.S. Provisional Application No. 61/775,059 filed on Mar. 8, 2013, all of which are incorporated herein by reference in their entirety.

DESCRIPTION

The present invention relates to a winter tyre.

Such a tyre is preferably intended to be mounted on wheels of high power and speed vehicles, like for example SUVs or particularly heavy sports cars.

A winter tyre typically comprises a tread band on which a plurality of circumferential and transversal grooves are formed. Such grooves delimit a corresponding plurality of blocks. Each of such blocks generally has a plurality of sipes. Each sipe defines in the respective block two adjacent block portions separated by the sipe.

The function of the sipes is essentially to offer further gripping edges on the snow-covered ground and to hold a certain amount of snow inside them, so as to offer a friction with the snow on the road surface greater than that offered by the tread band itself. Moreover, thanks also to the greater softness of the mixture typically used in winter tyres with respect to that typically used in summer tyres, and to the mobility of the two block portions defined by each sipe, the sipes allow the winter tyre to adapt better to the snow-covered road surface. Overall, thanks to the sipes it is possible to achieve an improvement in the performance of the tyre during acceleration, braking, cornering and as far as the lateral grip on a snow-covered road surface is concerned.

The provision of the sipes does, however, reduce the performance of the tyre on a snow-free road surface, be it dry or wet.

This reduction in performance is considered to be due to the fact that the different portions of the block separated by the sipes, being able to move with respect to one another, are not capable of offering sufficient resistance to tangential (or "shear") stresses applied to the block during acceleration, cornering or braking on a snow-free road surface, with consequent deformation of the block and reduction of its contact surface with the road surface itself.

The expression "circumferential" or "circumferentially" is used referring to a direction substantially parallel to the rolling direction of the tyre, i.e. a direction substantially parallel to the axial middle plane of the tyre.

The expression "axial" or "axially" is used referring to a direction substantially parallel to the rotation axis of the tyre, i.e. a direction substantially perpendicular to the axial middle plane of the tyre.

The expression "radial" or "radially" is used referring to a direction substantially perpendicular to the rotation axis of the tyre and belonging to a plane containing such a rotation axis.

The expression "longitudinal" or "longitudinally" is used referring to a main direction of extension of the sipe.

The expression "lateral stress", with reference to the tyre, or to the blocks, or to the sipes, is used to indicate a stress acting, on a plane tangent to the tyre, along a direction that is tilted with respect to the longitudinal direction.

The expression "profile which is substantially rectilinear" is used, referring to any surface portion of the sipe or of the blocks, to indicate that such a surface portion lies substantially on a plane or is shifted from such a plane by a negligible distance with respect to the longitudinal and radial dimensions of the same surface portion. Such a distance is considered negligible when it is not greater than one twentieth of the overall longitudinal extension of the surface portion.

The expression "profile which is substantially undulating" is used, with reference to any surface portion, to indicate the line defined, on an incident plane parallel both to the longitudinal direction of the sipe and to a plane tangent to the aforementioned surface portion, by a sequence of curvilinear or rectilinear lengths, which, going from a line defined by the intersection of the aforementioned incident plane with a reference plane different from said incident plane, progressively move apart from such a line until a first maximum shift point is reached, to then progressively move towards the aforementioned line until a null shift point is reached, such a sequence of lengths then proceeding with the same profile on the opposite side with respect to the aforementioned line and so on.

The "profile which is substantially undulating" can thus be defined by an alternating sequence of lengths that, in the aforementioned incident plane, create a line comprising an alternating sequence of portions with opposite concavity, wherein each of such portions can be defined both by a curved line and by a zigzag broken line.

As a particular case of a surface having a "profile which is substantially undulating" a surface comprising an alternating sequence of concave and convex portions is herein referred to.

Each concave and convex portion has, in the aforementioned incident plane, a maximum shift point from the aforementioned reference plane. The plurality of maximum shift points defined in each concave and convex portion when sectioning such a concave and convex portion with a plurality of incident planes that are parallel to one another defines a crest of the respective concave or convex portion.

The expression "transversal section" is used to refer to a section defined by any plane inclined by any angle with respect to the longitudinal direction of the sipe. Preferably, such an inclined plane is perpendicular to the longitudinal direction of the sipe.

JP 2003-118322 describes a winter tyre comprising a tread band in which at least one sipe comprises a corrugated or zigzag portion extending along a direction and a flat portion at the opposite sides of the corrugated portion along said direction. In an alternative embodiment, the flat portion is arranged under the corrugated portion.

WO 2012/164449 describes a winter tyre comprising a tread band on which a plurality of grooves is provided, at least one block delimited by the plurality of grooves, at least one sipe formed on the block and extending between a top and a bottom of the sipe and shaped so as to define, on each block portion separated by the sipe, a first surface facing the other block portion and extending from the top to an intermediate depth of the sipe, which has an undulating profile, and a second surface facing the other block portion, radiused to the first surface and extending from the intermediate depth up to the bottom, which has a rectilinear profile.

WO 2012/164450 describes a winter tyre provided with sipes shaped so as to define, on each block portion separated by a sipe, a first surface facing the other block portion and extending from the top to an intermediate depth of the sipe and a second surface facing the other block portion, radiused to the first surface and extending from the intermediate depth up to the bottom, in which the first surface has a profile which is rectilinear and the second surface has a profile which is undulating.

Hereafter reference will be made without distinction to the sipes or to one (or both) of the surfaces of the block portions separated by each sipe and facing the sipe Indeed, the profile of the aforementioned surfaces matches the profile of the sipe.

The Applicant has realised that, in order to obtain optimal performance of the tyre during acceleration, braking or cornering on a snow-covered road surface, it is advantageous to provide the tyre with sipes whose radially outer portion has a profile which is substantially undulating. The Applicant has indeed observed that the profile which is substantially undulating has a greater linear extension, under the same longitudinal extension, with respect to a profile which is substantially rectilinear and, therefore, offers a greater gripping edge on the snow-covered road surface and greater ability to hold snow.

The Applicant has also noted that the provision in the sipes of a profile which is substantially undulating, ensuring a mutual interconnection between the two block portions separated by each sipe, determines a high rigidity of the blocks with respect to lateral stresses and, consequently, excellent behaviour of the tyre as far as the lateral stability on a snow-covered road surface is concerned.

The Applicant has, however, noted that the provision in the tyre of sipes having a profile which is substantially undulating involves a degradation in the performance of the tyre as far as the lateral stability on a snow-free road surface is concerned when such a tyre is subjected to lateral stresses of a certain degree. The Applicant has attributed such a degradation to the excessive abrasion occurring on the two block portions separated by each sipe due to the mutual sliding of such block portions when they are subjected to the aforementioned lateral stresses.

The Applicant has noted that, in order to improve the aforementioned performance on a snow-free road surface, without penalizing the aforementioned performance on a snow-covered road surface, it is advantageous to use sipes having a substantially rectilinear profile arranged in a radially inner position with respect to a substantially undulating profile. The Applicant has indeed observed that the provision of a substantially rectilinear profile makes it possible to minimise the above-discussed sliding, thus reducing the negative effects produced thereby.

However, the Applicant has verified that, particularly in extreme lateral stress conditions on a snow-free road surface, like for example in the case of rapid and sudden turning with particularly powerful and heavy vehicles, problems of lateral stability remain in those tyres provided with sipes of the type described for example in WO 2012/164449.

The Applicant attributes the cause of such problems to an excessive yielding and mobility of the blocks at the respective radially inner portions thereof.

The Applicant has realised that in order to greatly improve the performance of the tyre as far as the lateral stability on a snow-free road surface is concerned it is necessary to have a good interconnection between the radially inner portions of the two block portions separated by each sipe.

The Applicant has perceived that it is possible to obtain such interconnection by providing, in the radially inner portions of the blocks, a profile which is substantially undulating.

The Applicant has, however, verified that it is appropriate to keep in a first radially outer portion of the sipe a profile which is substantially undulating and in a second more radially inner portion with respect to the aforementioned first portion a profile which is substantially rectilinear. This is in order to achieve all of the positive effects (described above) produced by such profiles on a snow-covered road surface and on a snow-free road.

The Applicant has finally found that it is possible to greatly improve the performance of the tyre as far as the lateral stability on a snow-free road surface is concerned and under extreme stress conditions, at the same time ensuring optimal behaviour on a snow-covered road surface during acceleration, braking or cornering and regarding the lateral grip, providing the tyre with sipes having both at a radially outer portion thereof and at a radially inner portion thereof a profile which is substantially undulating, such sipes also having at a radially intermediate portion thereof arranged between said radially outer portion and said radially inner portion a profile which is substantially rectilinear.

The present invention therefore relates to, in an aspect thereof, a winter tyre comprising a tread band wherein a plurality of blocks is defined, at least some of said blocks comprising at least one sipe extending from a top portion of the block towards a bottom portion of the block.

Preferably, said at least one sipe defines two adjacent block portions in the block, each of said two block portions comprising a surface facing said at least one sipe.

Preferably, said surface comprises a radially outer portion having a first profile which is substantially undulating.

Preferably, said surface comprises a radially inner portion having a second profile which is substantially undulating.

Preferably, said surface comprises an intermediate portion arranged between said radially outer portion and said radially inner portion and having a third profile which is substantially rectilinear.

The Applicant believes that the provision of a profile which is substantially undulating both at the radially outer portion and at the radially inner portion of the sipes ensures high interconnection between the block portions separated by the sipes, with consequent high rigidity of the block and, therefore, better response of the tyre to all stresses, even extreme ones, which the tyre is subjected to when used both on a snow-covered road surface and on a snow-free road surface. At the same time, the interposition of a substantially rectilinear profile between the aforementioned substantially undulating profiles ensures adequate control of mutual sliding of the block portions separated by each sipe when the block is subjected to extreme lateral stresses, nullifying the negative effects produced by such sliding.

The present invention, in the aforementioned aspect, can have at least one of the preferred characteristics indicated hereafter, both individually and in combination.

Preferably, said first profile and second profile are defined by a plurality of concave and convex portions arranged in an alternating sequence along a direction parallel to a longitudinal direction of said at least one sipe. In this way the desired interconnection between the block portions separated by the sipes is ensured along the entire longitudinal extension of each sipe.

Preferably, said longitudinal direction is parallel to a plane which is tangent to a radially outer surface of said tread band at said two block portions facing said sipe. The radial extension of each sipe is therefore constant in the entire tread band, thus guaranteeing homogeneous behaviour of the tyre on a snow-covered road surface.

More preferably, said longitudinal direction is tilted with respect to both an axial direction and a circumferential direction of the tyre. In this way, the rigidity given to the blocks by the interconnection of the two block portions defined by each sipe produces its advantageous effects both in response to axial stresses, like for example in the case of a sudden turn, and in response to circumferential stresses, like for example in the case of sudden acceleration or braking.

Preferably, said intermediate portion defines a reference plane.

Preferably, said reference plane substantially coincides with a radial plane of the tyre.

In preferred embodiments of the present invention, said concave and convex portions extend on opposite sides with respect to said reference plane.

Preferably, said concave and convex portions extend symmetrically on opposite sides with respect to said reference plane.

Preferably, each of the concave and convex portions of the first profile has a respective first crest whose distance from said reference plane progressively increases moving away in a radial direction from said intermediate portion to said top portion.

Preferably, each of the concave and convex portions of the second profile has a respective second crest whose distance from said reference plane progressively increases moving away in a radial direction from said intermediate portion towards said bottom portion.

Preferably, the distance of said first crest from said reference plane is substantially null at said intermediate portion.

Preferably, the distance of said second crest from said reference plane is substantially null at said intermediate portion.

In a preferred embodiment of the present invention, said surface has, in a transversal section taken at each concave portion of the first profile, a respective convex portion of the second profile and, in a transversal section taken at each convex portion of the first profile, a respective concave portion of the second profile.

In this case, the overall profile of the sipe is such that, in each transversal section of the sipe, the first profile and the second profile are arranged on opposite sides with respect to the aforementioned reference plane.

Preferably, said tread band comprises a central annular portion astride of an axial middle plane and two annular shoulder portions arranged on axially opposite sides with respect to the central annular portion, the central annular portion being separated from each annular shoulder portion by a respective circumferential groove.

Preferably, the sipe described above is provided on the blocks of said central annular portion and of only one of said annular shoulder portions.

More preferably, when the tyre is mounted on a rim forming a wheel of a motor vehicle, said annular shoulder portion is axially more external than the central annular portion with respect to said motor vehicle.

The Applicant has in fact verified that the sipe described above with reference to the first preferred embodiment of the present invention, produces its advantageous effects when provided in the portions of the tyre identified above. The blocks of the other annular shoulder portion of the tyre can in this case be provided with sipes of a different type, for example of a type similar to the sipes described in WO 2012/164450.

In further embodiments of the present invention, said surface has, in a transversal section taken at each concave portion of the first profile, a respective concave portion of the second profile and, in a transversal section taken at each convex portion of the first profile, a respective convex portion of the second profile.

In this case, the overall profile of the sipe is such that, in each transversal section of the sipe, the first profile and the second profile are arranged on the same side with respect to the aforementioned reference plane.

The Applicant has verified that the sipe described above with reference to the further preferred embodiments of the present invention produces its advantageous effects when provided on one of the annular shoulder portions of tyres of the "directional-type", i.e. in tyres that, in use, are stressed mainly at one of the two annular shoulder portions.

In another preferred embodiment of the present invention, each of the concave and convex portions of the second profile comprises a radially outer surface portion, a radially inner surface portion and an intermediate surface portion arranged between said radially outer surface portion and said radially inner surface portion, wherein said intermediate surface portion is substantially parallel to said reference plane.

The Applicant has verified that providing such a profile at the radially inner portion of the sipe ensures a greater interconnection effect between the adjacent block portions, with consequent further stiffening of the blocks.

Preferably, each of the concave and convex portions of the second profile has a respective third crest whose distance from said reference plane progressively increases moving away in a radial direction from the aforementioned intermediate portion to said intermediate surface portion.

More preferably, the distance of said third crest from said reference plane progressively decreases moving away in a radial direction from said intermediate surface portion towards said bottom portion.

Preferably, the distance of said third crest from said reference plane is substantially null at said intermediate portion.

In a further preferred embodiment of the present invention, said surface has, in a transversal section taken at each concave portion of the first profile, a respective concave portion of the second profile and, in a transversal section taken at each convex portion of the first profile, a respective convex portion of the second profile.

The Applicant has verified that such a sipe carries out its advantageous effects when foreseen in the blocks of the annular shoulder portions of the tyre. The blocks of the central annular portion of the tyre can in this case be provided with sipes of a different type, for example of a type similar to the sipes described in WO 2012/164449.

In another preferred embodiment of the present invention, said surface has, in a transversal section taken at each concave portion of the first profile, a respective convex portion of the second profile and, in a transversal section taken at each convex portion of the first profile, a respective concave portion of the second profile.

Preferably, said tread band comprises a central annular portion astride of an axial middle plane and two annular shoulder portions arranged on axially opposite sides with respect to the central annular portion, the central annular portion being separated from each annular shoulder portion by a respective circumferential groove, wherein said at least one sipe is provided only on the blocks of said annular shoulder portions.

The Applicant has verified that such a sipe particularly produces its advantageous effects when provided in the blocks of the annular shoulder portions of the tyre. The blocks of the central annular portion of the tyre can in this case be provided with sipes of a different type, for example of the type similar to the sipes described in WO 2012/16449 and/or WO 2012/16450.

In a different embodiment, said tread band comprises a central annular portion astride of an axial middle plane and two annular shoulder portions arranged on axially opposite sides with respect to the central annular portion, the central annular portion being separated from each annular shoulder portion by a respective circumferential groove, wherein said at least one sipe is provided only on the blocks of said central annular portion.

Preferably, when said surface is sectioned with an incident plane, said first profile and second profile define respective lines which are substantially sinusoidal.

In further preferred embodiments of the present invention, when said surface is sectioned with an incident plane, said first profile and second profile define respective zigzag broken lines.

Preferably, said zigzag broken lines comprise an alternating sequence of a first rectilinear length and a second rectilinear length.

Further characteristics and advantages of the present invention will become clearer from the following detailed description of its preferred embodiments, made with reference to the attached drawings. In such drawings:

FIGS. 4a, 4b and 4c are schematic views, respectively from above (FIG. 4a), in a transversal section taken along the reference plane A1-A1 of FIG. 4a (FIG. 4b) and in perspective (FIG. 4c), of a second embodiment of a sipe used in the tyre of FIG. 1;

FIGS. 6a, 6b and 6c are schematic views, respectively from above (FIG. 6a), in a transversal section taken along the reference plane A1-A1 of FIG. 6a (FIG. 6b) and in perspective (FIG. 6c), of a fourth embodiment of a sipe used in the tyre of FIG. 1.

Figure 1:
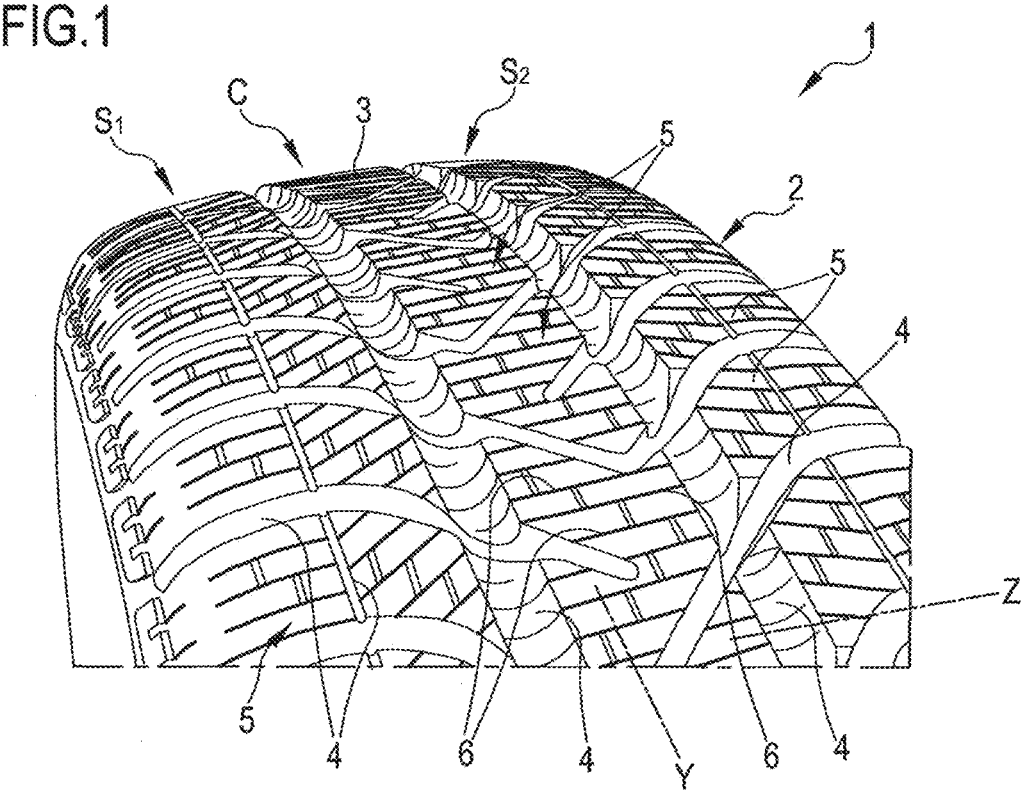
FIG. 1 is a schematic perspective view of a significant portion of a tyre in accordance with an exemplifying embodiment of the present invention.

With reference to FIG. 1, reference numeral 1 wholly indicates an exemplifying embodiment of a tyre in accordance with the present invention.

The tyre 1 comprises a carcass structure (not visible) arranged toroidally around an axis Z (substantially coinciding with the rotation axis of the tyre), a belt structure (not visible) arranged in a radially outer position with respect to the carcass structure and a tread band 2 arranged in a radially outer position with respect to the belt structure and having a radially outer surface 3 configured to come into contact with a road surface on which the tyre 1 is intended to roll.

On the tread band 2 a central annular portion C astride of an axial middle plane (not shown) and two annular shoulder portions S1, S2 arranged on axially opposite sides with respect to the central annular portion C can be identified. The central annular portion C is separated from each annular shoulder portion S1, S2 by a respective circumferential groove 4. The portion S1 is the one that, when the tyre 1 is mounted on a wheel of a motor vehicle, is located in an axially outer position with respect to the central annular portion C from the vehicle.

Further grooves, also generically indicated with 4, extending along circumferential and transversal directions are also provided on the tread band 2. All of the grooves 4 delimit a plurality of blocks 5 which are arranged in sequence preferably along a circumferential direction Y.

On each block 5 one or more sipes 6 are provided, the sipes extending along a longitudinal direction X that, like in the embodiment herein described and illustrated, can be tilted with respect both to the axial direction Z and to the circumferential direction Y.

For example, the longitudinal direction X can be tilted with respect to the axial direction Z by an angle α that is preferably greater than about 2°, more preferably greater than about 5° (FIGS. 3a, 4a, 5a and 6a). The angle α is preferably lower than about 45°, more preferably lower than about 40°. Even more preferably, the angle α is comprised between about 2° and about 45°, more preferably between about 5° and about 40°, for example equal to about 35°.

The aforementioned longitudinal direction X is preferably parallel to a plane which is tangent to the radially outer surface 3 of the tread band 2 at two block portions 9, 10, facing said sipe 6.

For the sake of simplicity of illustration, reference numerals 4, 5 and 6 are associated with just some of the grooves, blocks and sipes, respectively.

Alternative embodiments of the tyre 1 in which the blocks 5 have different configuration and orientation from those illustrated herein and in which the sipes 6 have different longitudinal extension and orientation from those illustrated herein are provided.

Preferably, each sipe 6 is open, at the opposite longitudinal ends 6a, 6b, on a pair of grooves 4 that delimit the block 5 itself, so that the sipe 6 crosses through the block 5 from one side to the other.

Figure 2:
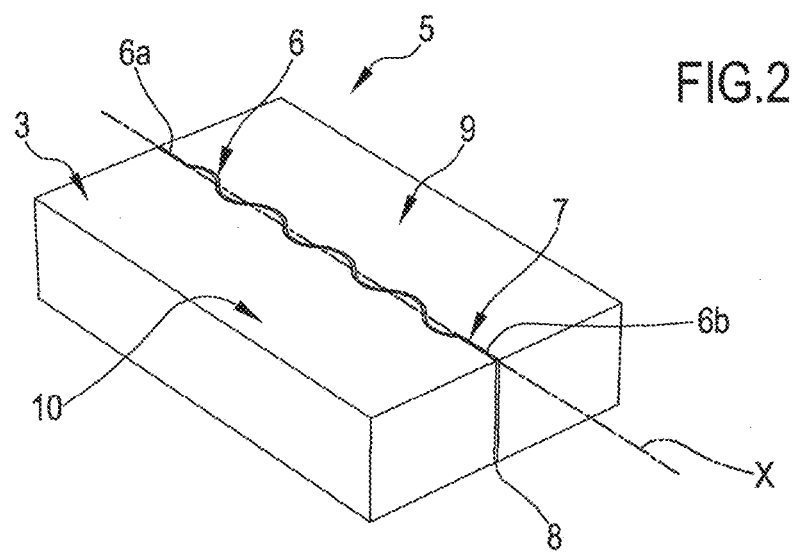
FIG. 2 is a schematic perspective view, in an enlarged scale, of a part of a block of the tyre of FIG. 1.

As shown in FIG. 2, each sipe 6 extends between a top portion 7 of the block 5, open on the radially outer surface 3 of the tread band 2, and a bottom portion 8 of the block 5, defined in a radially inner position of the tread band 2.

Each sipe 6 defines, in the block 5, said two block portions, which are respectively indicated with 9 and 10. Such a block portions are adjacent to one another, separated by the sipe 6 and spaced apart by an amount m that is kept substantially constant along the longitudinal direction X of the sipe 6 (FIGS. 3a, 4a, 5a and 6a).

Such a measurement m is for example greater than about 0.1 mm, more preferably greater than about 0.2 mm. The measurement m is preferably lower than about 0.8 mm, more preferably lower than about 0.6 mm. Even more preferably, the measurement m is comprised between about 0.1 mm and about 0.8 mm, more preferably between about 0.2 mm and about 0.6 mm, for example equal to about 0.4 mm.

Each block portion 9, 10 comprises a respective surface facing the sipe 6. Such a surface is configured identically to the sipe 6, so that what is said herein below with reference to the sipe 6 applies in an absolutely identical manner to each of the aforementioned surfaces and vice-versa.

At least some of the sipes 6 of the tyre 1 are shaped as described below.

Figure 3A:
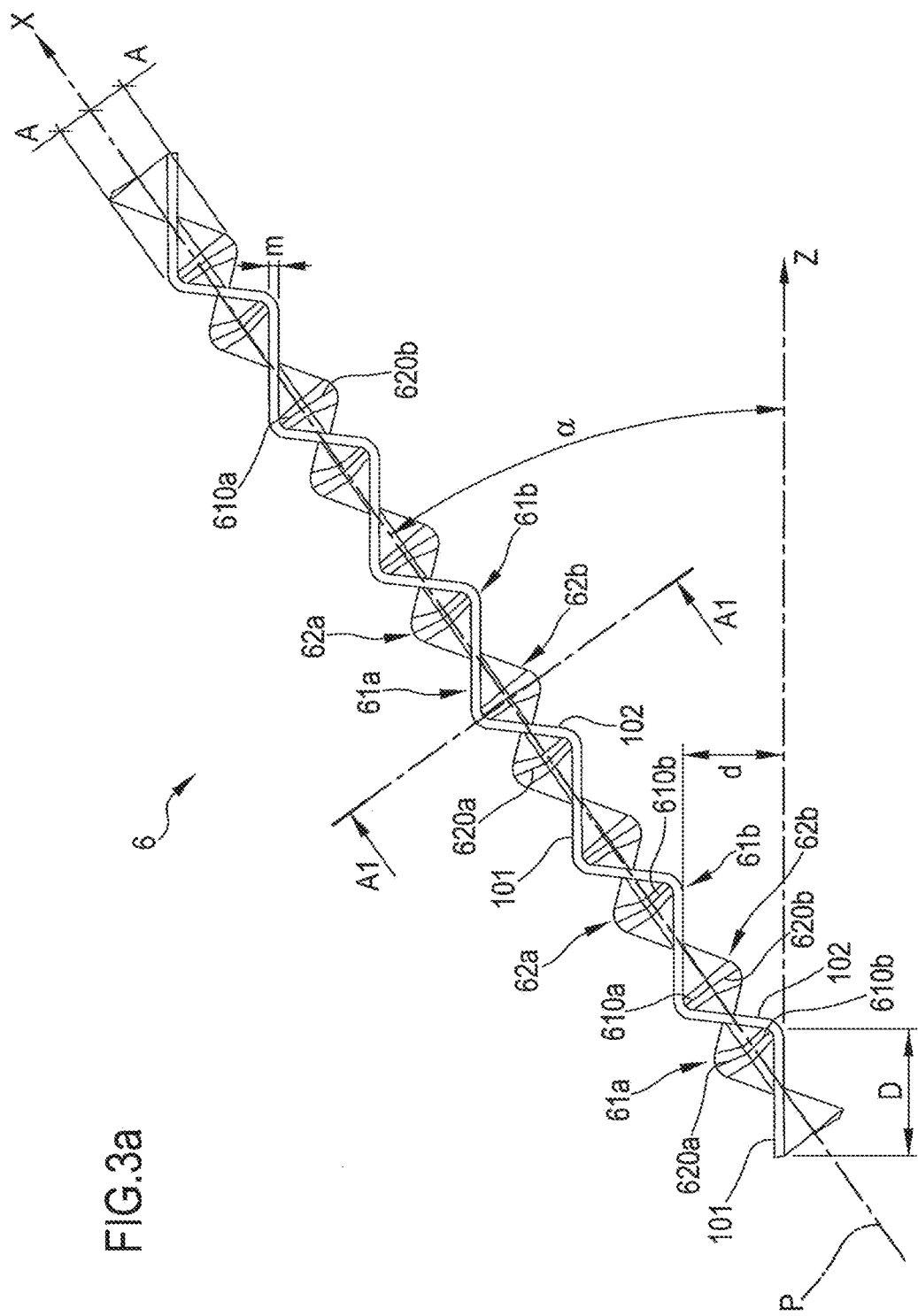
FIGS. 3a, 3b and 3c are schematic views, respectively from above (FIG. 3a), in a transversal section taken along the reference plane A1-A1 of FIG. 3a (FIG. 3b) and in perspective (FIG. 3c), of a first embodiment of a sipe used in the tyre of FIG. 1.
Figure 3B:
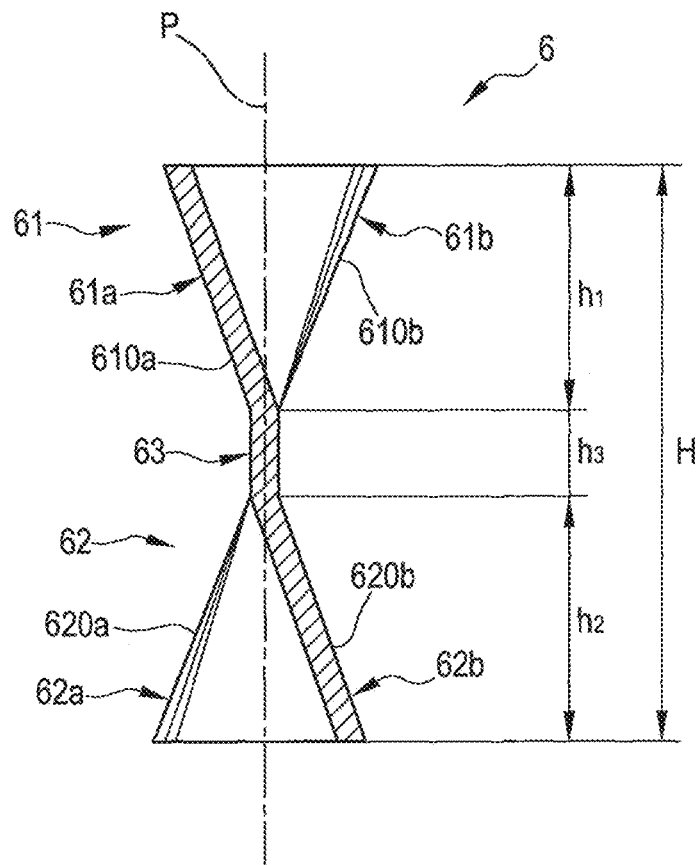
Figure 3C:
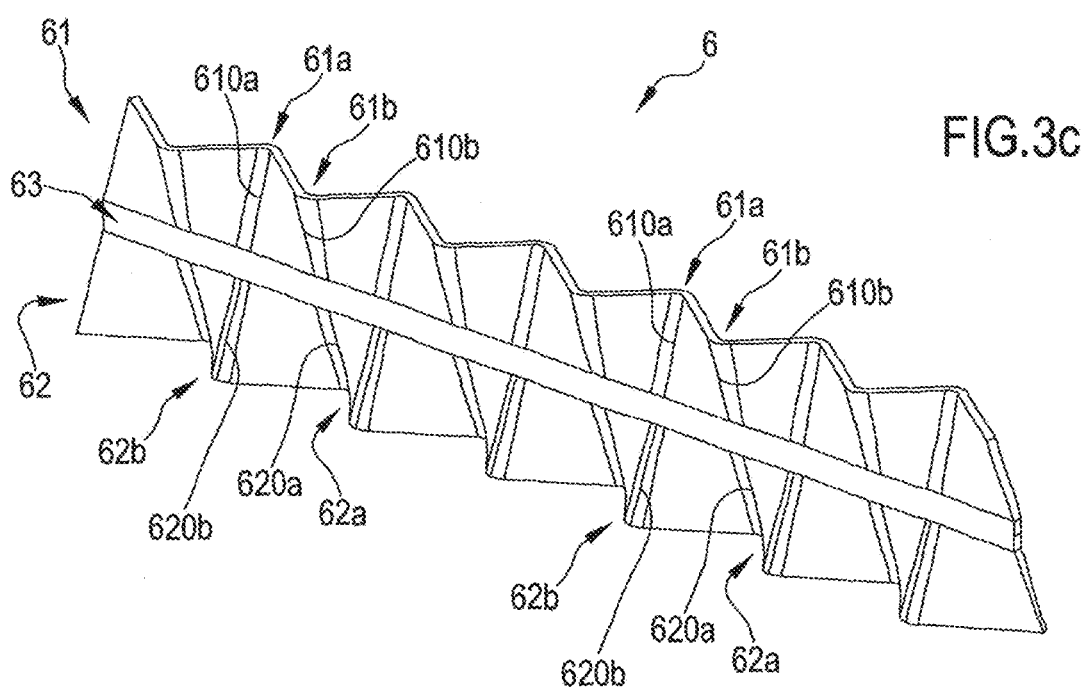

FIGS. 3a, 3b and 3c show a first embodiment of the sipe 6.

Such a sipe 6 comprises a radially outer portion 61, a radially inner portion 62 and an intermediate portion 63 arranged between the radially outer portion 61 and the radially inner portion 62.

The radially outer portion 61 and the radially inner portion 62 both have a profile which is substantially undulating, whereas the intermediate portion 63 has a profile which is substantially rectilinear.

Hereafter, the profile of the radially outer portion 61 is indicated as "first profile" and the profile of the radially inner portion 62 is indicated as "second profile".

The intermediate portion 63 is substantially flat. It defines in the block 5 a reference plane, indicated in FIGS. 3a and 3b with P. Such a reference plane P is parallel to the longitudinal direction X of the sipe 6 and preferably coincides with a radial plane of the tyre 1.

The radial extension h3 of the intermediate portion 63 is equal to a fraction of the overall radial extension H of the sipe 6. Preferably, the overall radial extension H is greater than 4 times the radial extension h3 of the intermediate portion 63. Preferably the overall radial extension H is greater than 5 times the radial extension h3 of the intermediate portion 63. For example, H can be equal to about 7 mm and h3 can be equal to about 1 mm.

Preferably, the intermediate portion 63 is arranged at a distance h1 from the top portion 7 of the block 5 comprised between about 1 mm and about 4 mm and at a distance h2 from the bottom portion 8 of the block 5 comprised between about 1 mm and about 10 mm, more preferably between about 2 mm and about 6 mm. For example, h1 and h2 can be equal to about 3 mm.

The first profile is suitably radiused to the intermediate portion 63 and is defined by a plurality of concave 61a and convex 61b portions arranged in alternating sequence along a direction parallel to the longitudinal direction X of the sipe 6. Preferably, the concave 61a and convex 61b portions extend symmetrically on opposite sides with respect to the reference plane P.

Similarly, the second profile is suitably radiused to the intermediate portion 63 and is defined by a plurality of concave 62a and convex 62b portions arranged in alternating sequence along the aforementioned direction parallel to the longitudinal direction X of the sipe 6, such concave 62a and convex 62b portions preferably extending symmetrically on opposite sides with respect to the reference plane P.

For the sake of simplicity of illustration, reference numerals 61a, 61b are associated with just some of the aforementioned concave portions and references numerals 62a, 62b are associated with just some of the aforementioned convex portions.

The sipe 6 shown in FIGS. 3a, 3b and 3c is shaped so that, in any transversal section of the sipe 6 (like for example the transversal section from which FIG. 3b originates) the first profile and the second profile are arranged on opposite sides with respect to the reference plane P. With specific reference to FIG. 3b, the shape of the sipe 6 is thus such that, on the section plane, at each concave portion 61a of the first profile there is a respective convex portion 62b of the second profile and at each convex portion 61b of the first profile there is a respective concave portion 62a of the second profile.

Moving along the longitudinal direction X of the sipe 6, at a central portion of each of the concave 61a and convex 61b portions of the first profile there is a respective crest 610a, 610b whose distance from the reference plane P progressively increases (preferably linearly) moving away from the intermediate portion 63 in the radial direction until the top portion 7 of the block 5 is reached. Similarly, at a central portion of each of the concave 62a and convex 62b portions of the second profile there is a respective crest 620a, 620b whose distance from the reference plane P progressively increases (preferably linearly) moving away from the intermediate portion 63 in the radial direction towards the bottom portion 8 of the block 5.

The crests 610a and 610b thus consist, in each of the concave 61a, 62a and convex 61b, 62b portions of the first profile and of the second profile, respectively, of plurality of points belonging to incident planes that are parallel to one another (each point belonging to one of said planes, so that the aforementioned points are aligned) having the maximum distance from the reference plane P with respect to the distance from the aforementioned reference plane of any other point of the respective concave 61a, 62a and convex 61b, 62b portion belonging to the same incident plane.

Preferably, at the intermediate portion 63 the distance A of the crests 610a, 610b, 620a, 620b from the reference plane P is substantially null, whereas at the top 7 and bottom 8 portions of the block 5 the distance A of the crests 610a, 610b, 620a, 620b from the reference plane P is comprised between about 0.5 mm and about 2 mm, preferably between about 1 mm and about 1.5 mm, for example equal to about 1.25 mm.

The first profile and the second profile extend along the longitudinal direction X of the sipe 6 for a length comprised between 50% and 100% of the entire longitudinal extension of the sipe 6. In the case in which there are areas of the sipe 6 not having the aforementioned profiles, such areas are coplanar to the intermediate portion 63 and are preferably provided both upstream and downstream of the aforementioned profiles along the longitudinal direction X (i.e. at the opposite longitudinal ends 6a, 6b of the sipe 6). In this case, preferably, the areas upstream and downstream have identical longitudinal and radial extensions.

In the embodiments herein illustrated, the first profile is configured so that, when sectioned with any incident plane, a zigzag broken line is obtained, which is clearly shown in FIG. 3a.

Preferably, the zigzag broken line comprises an alternating sequence of first and second rectilinear lengths, respectively indicated with 101 and 102, radiused together so that the broken line has, at the crests 610a, 610b, 620a, 620b, rounded vertices.

Preferably, the first and second rectilinear lengths 101, 102 extend substantially parallel to the axial direction Z and to the circumferential direction Y, respectively. In particular, there is a maximum shifting from the axial direction Z of about 2° and a maximum shifting from the circumferential direction Y of about 5°.

Moreover, all of the first rectilinear lengths 101 preferably have a substantially constant extension D, for example comprised between about 1.5 mm and about 10 mm, preferably between about 2 mm and about 6 mm, for example equal to about 4 mm, whereas the second rectilinear lengths 102 preferably have an extension d shorter than that of the first rectilinear lengths, for example comprised between 1.5 mm and about 10 mm, preferably between about 2 mm and about 5 mm, for example equal to about 3.5 mm.

The sipe 6 of FIGS. 3a, 3b and 3c has a preferred use in the blocks 5 of the central annular portion C and of the annular shoulder portion S1, in an axially outer position with respect to the vehicle on which the wheel comprising the tyre 1 is mounted. The blocks 5 of the annular shoulder portion S2 can in this case be provided with sipes of a different type, for example of the type similar to the sipes described in WO 2012/164450.

FIGS. 4a, 4b and 4c schematically show an alternative embodiment of the sipe 6 used in the tyre 1 of the present invention.

In such a figure, structural and functional elements that are identical to those described above with reference to FIGS. 3a, 3b and 3c are marked with the same reference numeral and are not described any further.

The sipe 6 of FIGS. 4a, 4b and 4c differs from that of FIGS. 3a, 3b and 3c only in that, in any transversal section of the sipe 6 (like for example the transversal section from which FIG. 4b originates) the first profile and the second profile are arranged on the same side with respect to the reference plane P. With particular reference to FIG. 4b, the shape of the sipe 6 is thus such that, on the section plane, at each concave portion 61a of the first profile there is a respective concave portion 62b of the second profile and at each convex portion 61b of the first profile there is a respective convex portion 62a of the second profile.

The sipe 6 of FIGS. 4a, 4b and 4c has a preferred use in the blocks 5 of one of the shoulder portions S1, S2 of a tyre 1 of the "directional-type".

FIGS. 5a, 5b and 5c and FIGS. 6a, 6b, 6c schematically show two further alternative embodiments of the sipe 6 used in the tyre 1 of the present invention.

In such figures, structural and functional elements that are identical to those described above with reference to FIGS. 3a, 3b and 3c are marked with the same reference numeral and are not described any further.

Figure 5A:
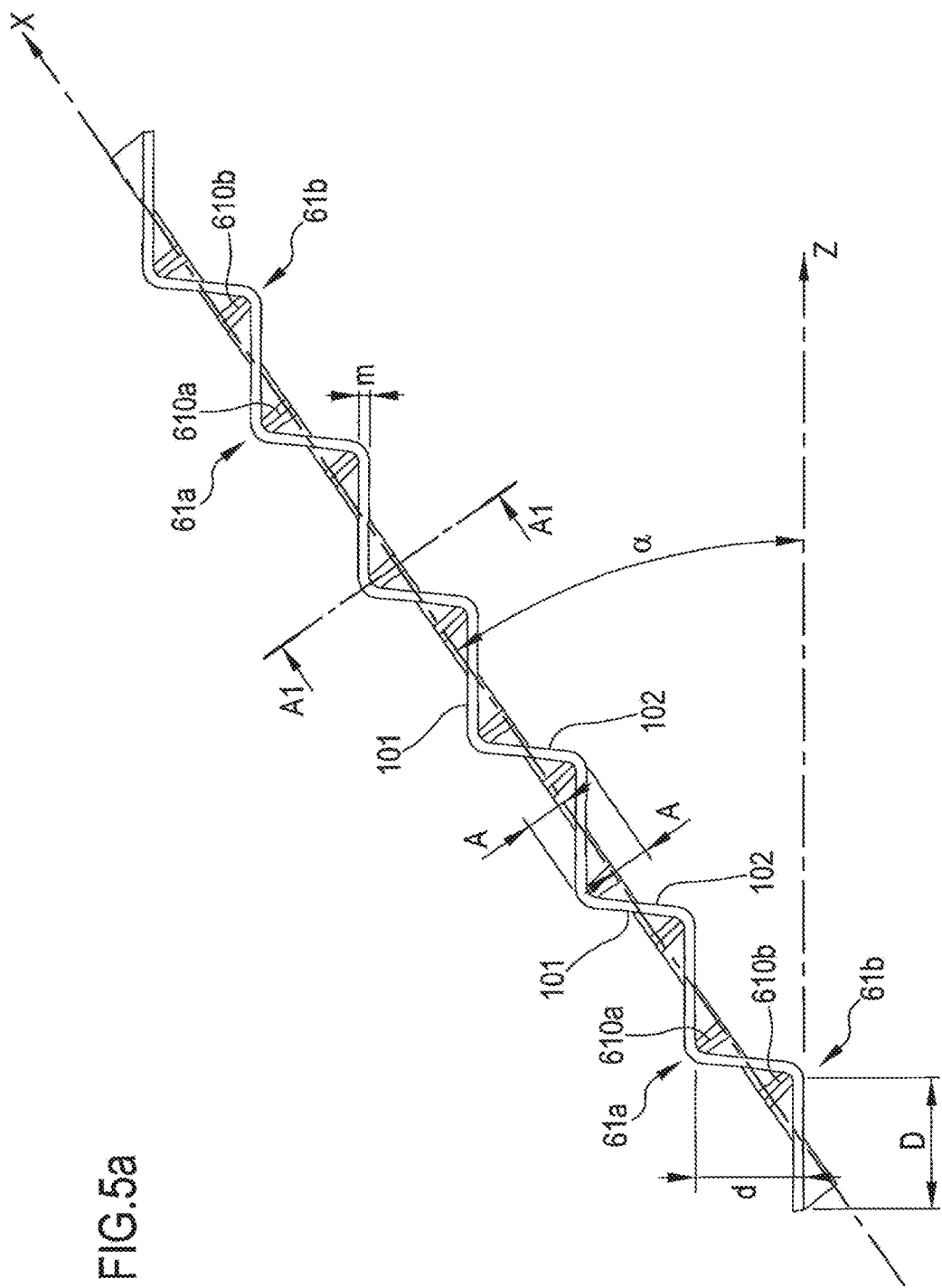
FIGS. 5a, 5b and 5c are schematic views, respectively from above (FIG. 5a), in a transversal section taken along the reference plane A1-A1 of FIG. 5a (FIG. 5b) and in perspective (FIG. 5c), of a third embodiment of a sipe used in the tyre of FIG. 1.
Figure 5B:
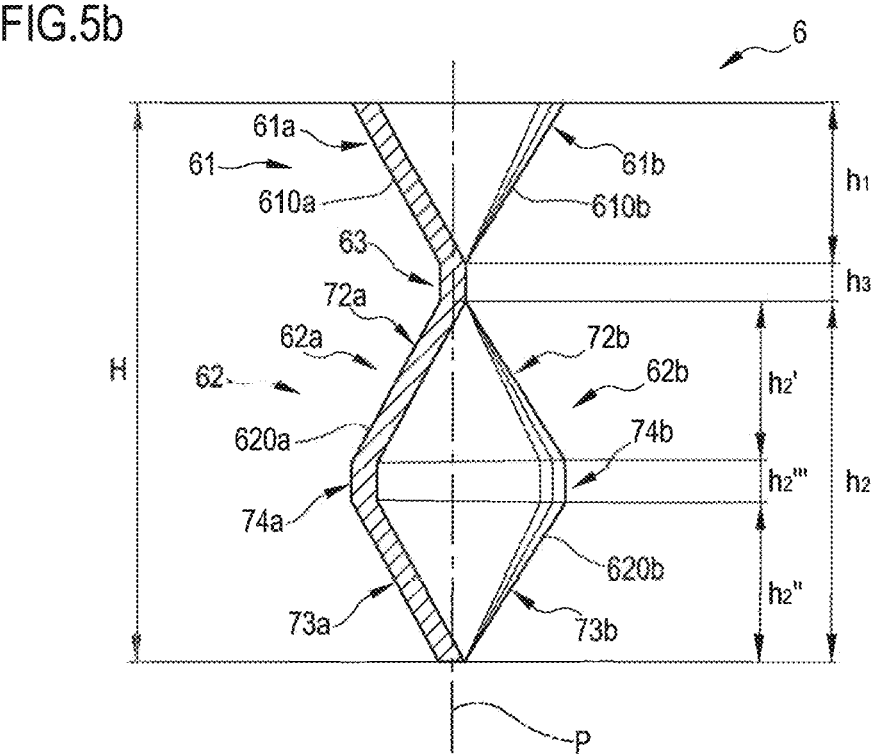
Figure 5C:
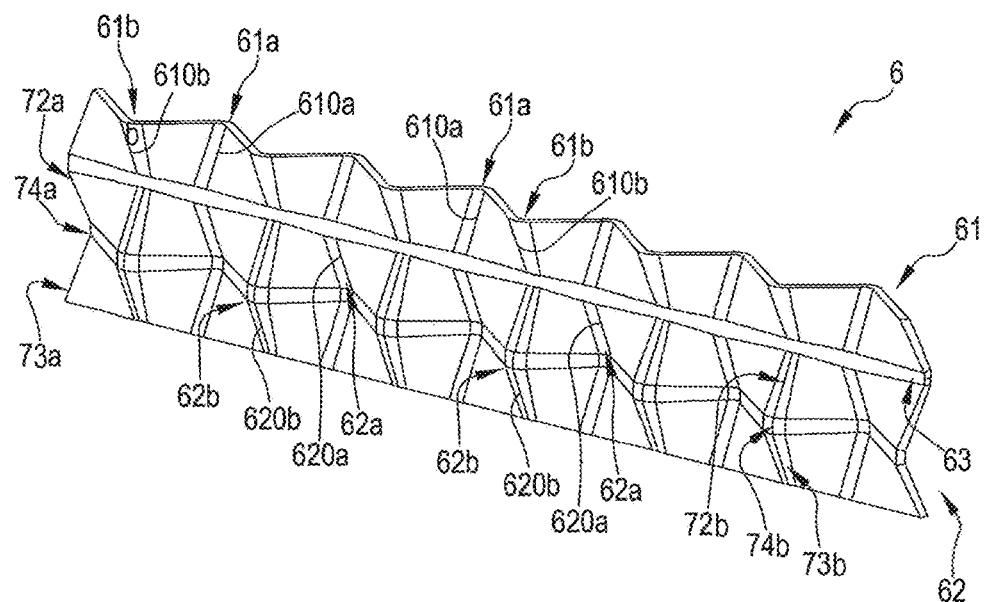
Figure 6A:
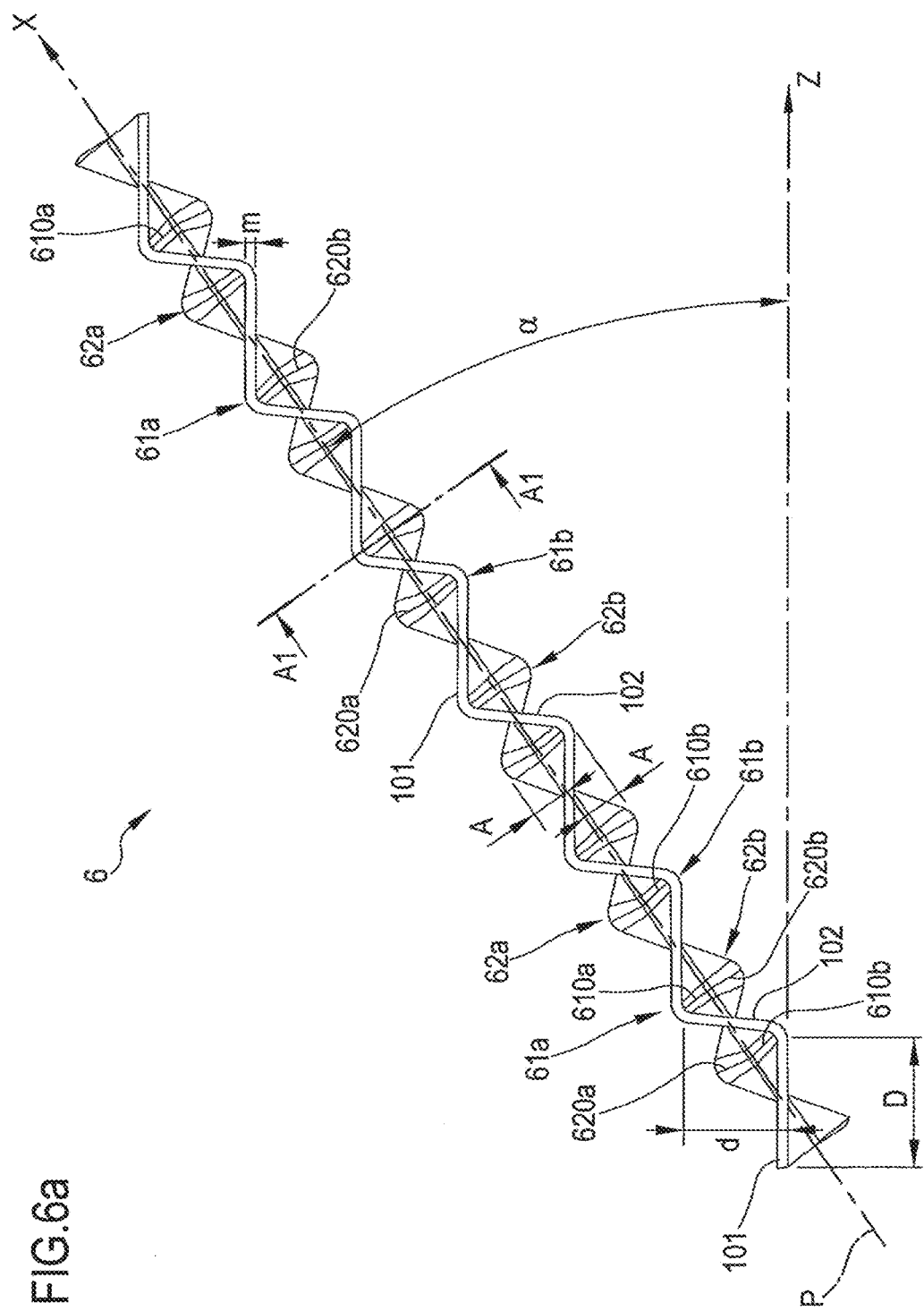

The sipe 6 of FIGS. 5a, 5b and 5c and of FIGS. 6a, 6b, 6c differs from that of FIGS. 3a, 3b and 3c only for the different shape of the second profile and for the different radial dimensions of the radially outer portion 61, of the radially inner portion 62 and of the intermediate portion 63.

In particular, each of the concave portions 62a of the second profile comprises a radially outer surface portion 72a, a radially inner surface portion 73a and an intermediate surface portion 74a. Similarly, each of the convex portions 62b of the second profile comprises a radially outer surface portion 72b, a radially inner surface portion 73b and an intermediate surface portion 74b arranged between the radially outer surface portion 72b and the radially inner surface portion 73b.

In any transversal section of the sipe 6, the intermediate surface portions 74a, 74b are substantially rectilinear and are apart from the reference plane P by the distance A discussed above.

The radially outer surface portions 72a, 72b and the radially inner surface portions 73a, 73b are properly radiused to the intermediate surface portions 74a, 74b.

The crest 620a, 620b of each of the concave 62a and convex 62b portions of the second profile has a distance from the reference plane P that progressively increases (preferably linearly) moving away in the radial direction from the intermediate portion 63 up to the intermediate surface portion 74a, 74b, to then proceed parallel to the reference plane P at the intermediate surface portion 74a, 74b and finally progressively decrease (preferably linearly) moving away from the intermediate surface portion 74a, 74b in the radial direction towards the bottom portion 8 of the block 5. Preferably, such a distance is substantially null at the intermediate portion 63 and at the bottom portion 8.

The radial extension h3 of the intermediate portion 63 is preferably lower than (for example half) the radial extension h3 of the sipe 6 shown in FIGS. 3a, 3b, 3c, the radial extension H being equal. For example, in the embodiments shown in FIGS. 5a, 5b, 5c and 6a, 6b, 6c h3 it can be equal to about 0.5 mm.

Preferably, the intermediate portion 63 is arranged at a distance h1 from the top portion 7 of the block 5 that is lower than the distance h1 of the sipe 6 shown in FIGS. 3a, 3b, 3c, the overall radial extension H being equal. Consequently, the intermediate portion 63 is arranged at a distance h2 from the bottom portion 8 of the block 5 that is greater than the distance h2 of the sipe 6 shown in FIGS. 3a, 3b, 3c, the overall radial extension H being equal. For example, in the embodiments shown in FIGS. 5a, 5b, 5c and 6a, 6b, 6c h1 can be equal to about 2 mm and h2 can be equal to about 4.5 mm.

Preferably, the intermediate surface portion 74a, 74b has a radial extension h2''' which is equal to the radial extension h3 of the intermediate portion 63. For example, h2''' can be equal to about 0.5 mm.

Preferably, the intermediate surface portion 74a, 74b is arranged at a distance h2' from the intermediate portion 63 that is equal to the distance h2'' from the bottom portion 8. For example h2' and h2'' can be equal to about 2 mm.

With particular reference to FIGS. 5a, 5b, 5c, the sipe 6 shown in such figures has a configuration such that, like in the embodiment of FIGS. 4a, 4b and 4c, in any transversal section of the sipe 6 (like for example the transversal section from which FIG. 5b originates) the first profile and the second profile are arranged on the same side with respect to the reference plane P. On the section plane, therefore, at each concave portion 61a of the first profile there is a respective concave portion 62b of the second profile and at each convex portion 61b of the first profile there is a respective convex portion 62a of the second profile.

The sipe 6 of FIGS. 5a, 5b and 5c has a preferred use in the blocks 5 of the annular shoulder portions S1, S2 of the tyre 1. The blocks of the central annular portion C can in this case be provided with sipes of a different type, for example of the type similar to the sipes described in WO 2012/164449.

On the other hand, with particular reference to FIGS. 6a, 6b, 6c, the sipe 6 shown in such figures has a configuration such that, like in the embodiment of FIGS. 3a, 3b and 3c, in any transversal section of the sipe 6 (like for example the transversal section from which FIG. 6b originates) the first profile and the second profile are arranged on opposite sides with respect to the reference plane P. On the section plane, therefore, at each concave portion 61a of the first profile there is a respective convex portion 62b of the second profile and at each convex portion 61b del first profile there is a respective concave portion 62a of the second profile.

The sipe 6 of FIGS. 6a, 6b and 6c has a preferred use in the blocks 5 of the annular shoulder portions S1 and S2 of the tyre 1. The blocks of the central annular portion C can in this case be provided with sipes of a different type, for example of a type similar to the sipes described in WO 2012/16449 and/or WO 2012/16450.

The sipe 6 of FIGS. 6a, 6b and 6c can also have a use in the blocks 5 of the central annular portion C of the tyre 1. The blocks of the annular shoulder portions S1 and S2 can in this case be provided with sipes of a different type, for example of a type similar to the sipes described in WO 2012/16449 and/or WO 2012/16450.

Of course, a man skilled in the art can make further modifications and variants to the invention described above in order to satisfy specific and contingent use requirements, said variants and modifications in any case being within the scope of protection as defined by the following claims.

The invention claimed is:

1. A winter tyre, comprising a tread band wherein a plurality of blocks is defined, at least some of said blocks comprising at least one sipe extending from a top portion of the block towards a bottom portion of the block, wherein said at least one sipe defines two adjacent block portions in the block, each of said two block portions comprising a surface facing said at least one sipe, said surface comprising:
   a radially outer portion having a first profile which is substantially undulating;
   a radially inner portion having a second profile which is substantially undulating; and
   an intermediate portion arranged between said radially outer portion and said radially inner portion and having a third profile which is substantially rectilinear;
wherein
   said intermediate portion defines a reference plane substantially coinciding with a radial plane of the tyre,
   said first profile and second profile are defined by a plurality of concave and convex portions arranged in an alternating sequence along a direction parallel to a longitudinal direction of said at least one sipe, and each of the concave and convex portions of the second profile comprises:
      a radially outer surface portion,
      a radially inner surface portion, and
      an intermediate surface portion arranged between said radially outer surface portion and said radially inner surface portion, wherein said intermediate surface portion is substantially parallel to said reference plane in any transversal section of the sipe,
   in any transversal section of the sipe, each intermediate surface portion of each concave and convex surface portion is substantially rectilinear, and
   at a crest of each concave and convex surface portion, the intermediate surface portion is spaced apart from said reference plane.

2. The tyre according to claim 1, wherein said longitudinal direction is parallel to a plane which is tangent to a radially outer surface of said tread band at said two block portions facing said sipe.

3. The tyre according to claim 1, wherein said longitudinal direction is tilted with respect to both an axial direction and a circumferential direction of the tyre.

4. The tyre according to claim 1, wherein said concave and convex portions extend symmetrically on opposite sides with respect to said reference plane.

5. The tyre according to claim 1, wherein each of the concave and convex portions of the first profile has a respective first crest whose distance from said reference plane progressively increases moving away in a radial direction from said intermediate portion to said top portion.

6. The tyre according to claim 5, wherein the distance of said first crest from said reference plane is substantially null at said intermediate portion.

7. The tyre according to claim 5, wherein each of the concave and convex portions of the second profile has a respective second crest whose distance from said reference plane progressively increases moving away in a radial direction from said intermediate portion towards said bottom portion.

8. The tyre according to claim 7, wherein the distance of said second crest from said reference plane is substantially null at said intermediate portion.

9. The tyre according to claim 1, wherein said surface has, in a transversal section taken at each concave portion of the first profile, a respective convex portion of the second profile and, in a transversal section taken at each convex portion of the first profile, a respective concave portion of the second profile.

10. The tyre according to claim 1, wherein said tread band comprises a central annular portion astride of an axial middle plane and two annular shoulder portions arranged on axially opposite sides with respect to the central annular portion, the central annular portion being separated from each annular shoulder portion by a respective circumferential groove, wherein said at least one sipe is provided on the blocks of said central annular portion and of only one of said annular shoulder portions.

11. The tyre according to claim 10, wherein when the tyre is mounted on a rim to form a wheel of a motor vehicle and said annular shoulder portion is axially more external than the central annular portion with respect to said motor vehicle.

12. The tyre according to claim 1, wherein said surface has, in a transversal section taken at each concave portion of the first profile, a respective concave portion of the second profile and, in a transversal section taken at each convex portion of the first profile, a respective convex portion of the second profile.

13. The tyre according to claim 12, wherein said tread band comprises a central annular portion astride of an axial middle plane and two annular shoulder portions arranged on axially opposite sides with respect to the central annular portion, the central annular portion being separated from each annular shoulder portion by a respective circumferential groove, wherein said at least one sipe is provided only on the blocks of said annular shoulder portions.

14. The tyre according to claim 12, wherein said tread band comprises a central annular portion astride of an axial middle plane and two annular shoulder portions arranged on axially opposite sides with respect to the central annular portion, the central annular portion being separated from each annular shoulder portion by a respective circumferential groove, wherein said at least one sipe is provided only on the blocks of said central annular portion.

15. The tyre according to claim 1, wherein each of the concave and convex portions of the second profile has a respective third crest whose distance from said reference plane progressively increases moving away in a radial direction from said intermediate portion to said intermediate surface portion.

16. The tyre according to claim 15, wherein the distance of said third crest from said reference plane progressively decreases moving away in a radial direction from said intermediate surface portion towards said bottom portion.

17. The tyre according to claim 15, wherein the distance of said third crest from said reference plane is substantially null at said intermediate portion.

18. The tyre according to claim 1, wherein when said surface is sectioned with an incident plane, said first profile and second profile define respective lines which are substantially sinusoidal.

19. The tyre according to claim 1, wherein when said surface is sectioned with an incident plane, said first profile and second profile define respective zigzag broken lines.

20. The tyre according to claim 19, wherein said zigzag broken lines comprise an alternating sequence of a first rectilinear length and a second rectilinear length.

* * * * *